United States Patent
Shtendel et al.

(10) Patent No.: US 11,463,388 B2
(45) Date of Patent: Oct. 4, 2022

(54) SYSTEM, DEVICE AND METHODS FOR EXCHANGE OF MESSAGE/FILE OVERTLY AND COVERTLY AND CREATION OF DYNAMIC SUBGROUPS

(71) Applicant: S.G.A. INNOVATIONS LTD., Beer Sheva (IL)

(72) Inventors: Yuval Shtendel, Lehavim (IL); Shmuel Gal, Kibbutz Bet Kama (IL); Alexey Tsirlin, Beer Sheva (IL); Ronit Shtendel, Lehavim (IL); Noa Shtendel, Lehavim (IL)

(73) Assignee: S.G.A. INNOVATIONS LTD., Beer Sheva (IL)

( * ) Notice: Subject to any disclaimer, the term of this patent is extended or adjusted under 35 U.S.C. 154(b) by 21 days.

(21) Appl. No.: 17/041,212

(22) PCT Filed: Mar. 28, 2019

(86) PCT No.: PCT/IL2019/050363
§ 371 (c)(1),
(2) Date: Sep. 24, 2020

(87) PCT Pub. No.: WO2019/186565
PCT Pub. Date: Oct. 3, 2019

(65) Prior Publication Data
US 2021/0036975 A1     Feb. 4, 2021

Related U.S. Application Data

(60) Provisional application No. 62/649,590, filed on Mar. 29, 2018, provisional application No. 62/649,589, filed on Mar. 29, 2018.

(51) Int. Cl.
*H04L 51/04* (2022.01)
*G06K 7/10* (2006.01)
(Continued)

(52) U.S. Cl.
CPC .......... *H04L 51/04* (2013.01); *G06K 7/10297* (2013.01); *G06K 7/1417* (2013.01); *H04L 9/3247* (2013.01); *H04L 67/06* (2013.01)

(58) Field of Classification Search
CPC .. G06K 7/10297; G06K 7/1417; G06Q 10/10; G06Q 50/01; H04L 51/04; H04L 67/06; H04L 9/3247
See application file for complete search history.

(56) References Cited

U.S. PATENT DOCUMENTS 6,192,396 B1 *   2/2001  Kohler ................. G06Q 10/107
                                                    707/999.005
9,396,456 B1    7/2016  Wang et al.
(Continued)

FOREIGN PATENT DOCUMENTS

KR   101565422 B1 *  11/2015  ............. H04L 29/10
WO   2011086542 A2    7/2011

OTHER PUBLICATIONS

PCT Search Report for International Application No. PCT/IL2019/050363 dated Jul. 11, 2019, 4 pp.
(Continued)

*Primary Examiner* — Alina A Boutah
(74) *Attorney, Agent, or Firm* — The Roy Gross Law Firm, LLC; Roy Gross

(57) ABSTRACT

The present invention provides systems, devices and methods for dynamic communication of overtly and covertly data sections in a message, wherein the covertly data may be selectively manipulated by the sender of the message and wherein the dynamic communication includes creation of one or more subgroups.

19 Claims, 12 Drawing Sheets

(51) Int. Cl.
*G06K 7/14* (2006.01)
*H04L 9/32* (2006.01)
*H04L 67/06* (2022.01)

(56) References Cited

U.S. PATENT DOCUMENTS

| | | | | |
|---|---|---|---|---|
| 2002/0157003 | A1* | 10/2002 | Beletski | H04L 9/3231 |
| | | | | 713/170 |
| 2005/0262206 | A1* | 11/2005 | Weir | G06Q 10/107 |
| | | | | 709/206 |
| 2014/0096033 | A1* | 4/2014 | Blair | H04L 51/04 |
| | | | | 715/752 |
| 2014/0164199 | A1* | 6/2014 | Wilkes | G06Q 50/01 |
| | | | | 705/35 |
| 2014/0304508 | A1* | 10/2014 | Murphy | H04L 63/0442 |
| | | | | 713/168 |
| 2014/0334723 | A1* | 11/2014 | Chatow | G06K 9/00577 |
| | | | | 382/165 |
| 2015/0106877 | A1* | 4/2015 | Meyers | H04L 51/24 |
| | | | | 726/3 |
| 2015/0120406 | A1* | 4/2015 | Ekberg | G06Q 30/0641 |
| | | | | 705/14.5 |
| 2015/0347357 | A1* | 12/2015 | Maughan | G06Q 10/107 |
| | | | | 715/205 |
| 2016/0344667 | A1 | 11/2016 | Lane et al. | |
| 2017/0250931 | A1* | 8/2017 | Ioannou | H04L 67/2833 |
| 2018/0054414 | A1* | 2/2018 | LeVasseur | G06F 21/606 |
| 2018/0234380 | A1* | 8/2018 | Jayaram | H04L 51/32 |
| 2019/0303634 | A1* | 10/2019 | Broselow | G06K 7/1417 |

OTHER PUBLICATIONS

PCT Written Opinion for International Application No. PCT/IL2019/050363 dated Jul. 11, 2019, 4 pp.

PCT Preliminary Report on Patentability for International Application No. PCT/IL2019/050363 dated Sep. 29, 2020, 5 pp.

* cited by examiner ated filing date of Mar. 28, 2019, which claims the benefit of
SYSTEM, DEVICE AND METHODS FOR EXCHANGE OF MESSAGE/FILE OVERTLY AND COVERTLY AND CREATION OF DYNAMIC SUBGROUPS

CROSS REFERENCE TO RELATED APPLICATIONS

This application is a National Phase of PCT Patent Application No. PCT/IL2019/050363 having International filing date of Mar. 28, 2019, which claims the benefit of priority of U.S. Provisional Application No. 62/649,589 filed on Mar. 29, 2018 and U.S. Provisional Application No. 62/649,590 filed Mar. 29, 2018. The contents of the above applications are all incorporated by reference as if fully set forth herein in their entirety.

FIELD OF THE INVENTION

The invention relates to the field of message/file exchange applications, more specifically, the invention enables to manipulate the exchanged message/file in various ways.

BACKGROUND

Currently, there are various applications for message/file exchange, such as, chat applications. These applications allow message and/or file exchange between two individuals/users or within a predefined group. Most of these applications also support an End to End encryption for enhanced security and privacy. Some of the applications can also allow switching between group chat to private chat with a group member and/or allow receiving of message at specific locations.

However, there is a need in the art for systems, devices and methods that can allow communicating overtly and covertly various types of data, while allowing selective viewing/hearing of the covertly data sections, and optionally allowing dynamic subgroup creation.

SUMMARY OF THE INVENTION

The present invention, in embodiments thereof, provides systems, devices and methods that can allow communicating, overtly and covertly, of various types of data (such as text messages, voice messages and files), while allowing selective viewing/hearing of the covertly data sections, and/or dynamic (per message) subgroup creation.

In some embodiments, the present invention provides methods, devices, and systems that enable communicating over a wireless network (such as, cellular network) between communicating devices (such as, cellular phones), various types of data (including, for example, text messages, files, including: images, pictures, documents, audio files, music files, video files, and the like), such that the data includes overtly and covertly data sections, while allowing selective manipulation of the communicated data.

In some embodiments, the data includes a mixture of overtly and covertly sections such that in the manipulated data (for example, a message that includes the mixture of such data), the overtly sections can be viewed/heard by all users that participate in the communication ("subgroup"), while the covertly sections can be viewed/heard only by selected subgroup/s ("secret subgroup/s") thereof. In some embodiments, the data includes only covertly sections. In some embodiments, the recipient(s) list can be determined by the sender.

In some embodiments, the covertly sections may be encoded using selected invisible characters.

In some embodiments, the selective manipulation of the covertly data may be restricted to specific users ("secret subgroup/s"), specific time, specific location, spatio-temporal distribution, and the like, or any combination thereof.

According to further embodiments, a second authentication means (for example, physical mean, such as, dedicated barcode, QR code and/or RF-ID such as Near Field Communication (NFC) element) may be used, to allow viewing/hearing of the covertly sections.

In some embodiments, an additional dedicated hardware device (such as, external display/earplugs) may be used, to allow viewing/hearing of the covertly sections.

In some embodiments, the viewing/hearing restrictions of the covertly messages can be determined/changed per each message.

According to some embodiments, the disclosed methods, devices and systems are advantageous over currently used methods and systems for message exchange, as they allow or have the ability to: Manipulatively send overtly and covertly text messages and files (pictures, documents, music, video clips, etc.) to individual users, groups of users and/or subgroups of users, with or without end to end encryption; Include multiple overtly and covertly sections within the same message; Use selected invisible characters to encode the covertly sections; Dynamically ban (per message) members from receiving the message (creating a "subgroup"); Dynamically ban (per message) members from reading (or listening to) the covertly sections (creating a "secret subgroup"); Use multiple levels of manipulation (creating more than one "secret subgroup"); Set geographical (location based) decrypt restriction; Set time and date decrypt restrictions; Set geographical decrypt restrictions combined with time and date decrypt restrictions; Force group decryption restrictions; Restrict the number of users that can download a file (for example, on a "first come first serve" basis); Add time restrictions to a file, apart from the restrictions set to the message; Use a dedicated external display/earplugs to view/hear the covertly data sections; Use NFC and/or QR, as a second authentication; Use the NFC and/or QR as a digital signature of the sender; Create special tattoos to serve as the QR code; Assimilate the NFC and QR tags in fabric, clothing, smart watch, watches, fitness trackers, hats; and the like; use dedicated external display/earplugs to view/hear the covertly sections.

In some embodiments, the systems, devices and methods disclosed herein can be readily implemented within or added on existing communication applications (such as, chat applications). In some embodiments, the methods disclosed can be in the form of an application and the systems and devices may include communication system (such as, portable devices, readable storage media, servers, etc.), capable of executing the disclosed methods.

According to some embodiments, there is provided a method for dynamic communication of overtly and covertly data sections, the method may include sending and/or receiving a message, said message may include overtly and covertly data sections, wherein the covertly data is selectively manipulated by a sender of the message, wherein the dynamic communication may include creation of a sub group.

In some embodiments, there is provided a method for dynamic communication, the method includes one or more of the steps of: creating a sub group of member(s); creating a message comprising overtly data section(s) and covertly data section(s); selectively manipulating the covertly data section(s) by a sender; and sending the message to the subgroup.

In some embodiments, the subgroup may include one or more secret subgroup(s), or any combination thereof.

In some embodiments, the message is received by member(s) of the subgroup.

In some embodiments, selectively manipulating the covertly data may include adding one or more restrictions to the message decryption, such that viewing and/or hearing the message by member(s) of the subgroup is selective.

According to some embodiments, the data may include text messages, images, documents, audio files, video files, or any combination thereof.

According to some embodiments, the method may further include adding a file to the message, wherein the downloading of the file by the member(s) of the subgroup is selective.

In some embodiments, the method may further include distributing a symmetric key. According to some embodiments, the distribution of the symmetric key may be performed via 3rd party chat application.

According to some embodiments, sending and/or receiving the message in the subgroup may be performed via 3rd party chat application.

According to some embodiments, the selective viewing and/or hearing includes validating that the recipient is approved to view/hear the covert data sections of the message, wherein the recipient is a member of the secret subgroup.

According to some embodiments, the validating step may further include determining one or more of: that a time restriction is met, that a location restriction is met, that a force group decryption restriction is met, or any combination thereof.

According to some embodiments, the selective viewing and/or hearing may be subject to the use of a dedicated external hardware. According to some embodiments, the dedicated external hardware may be in the form of external display and/or earplugs.

According to some embodiments, the step of downloading an attached file may include validating that the recipient is approved to download the attached file.

According to some embodiments, the validating step may further include determining one or more of: time restriction is met; and/or number of users that already downloaded the file restriction is met, or any combination thereof.

According to some embodiments, the method may be used for communicating the message between at least two end users, between groups of users and/or between subgroups of users.

According to some embodiments, the dynamic communication may be determined or modified per each message.

According to some embodiments, the selective manipulation of the covertly data may be determined or modified per each message.

According to some embodiments, multiple overtly and covertly sections may be included within the same message.

According to some embodiments, the method may further include an additional authentication step for identifying specific users.

According to some embodiments, the additional authentication step may include use of such means as, RF-ID such as Near Field Communication (NFC) tag and/or Quick Response (QR) code means.

According to some embodiments, the NFC and/or QR may be assimilated in, embedded with or associated with wearables. According to some embodiments, the QR may be in the form of a QR tattoo(s).

According to some embodiments, the additional authentication may serve as the recipient's second authentication and/or as the sender's digital signature.

According to some embodiments, the method may be executed on a portable communication device comprising one or more of: a processor, a transmitting unit, a receiving unit, a display unit, an input unit, a graphical user interface (GUI), location service mechanism. or any combination thereof.

According to some embodiments, the portable communication device may be a smartphone.

According to some embodiments, there is provided a portable communication device comprising one or more of: a processor, a transmitting unit, a receiving unit, a display unit, an input unit, a graphical user interface (GUI), location service mechanism, or combinations thereof, said communication device is capable of executing a method for dynamic communication of overtly and covertly data sections, the method comprising sending and/or receiving a message, said message may include overtly and covertly data sections, wherein the covertly data is selectively manipulated by a sender of the message, wherein the dynamic communication may include creation of a sub group.

According to some embodiments, the sub group may include one or more secret subgroup(s), or any combination thereof.

According to some embodiments, selectively manipulating the covertly data may include adding one or more restrictions to the message decryption to create overt and covert data sections in the message, such that viewing and/or hearing the message by member(s) of the subgroup is selective.

According to some embodiments, there is provided a system for communicating overtly and covertly data sections, the system may include: a portable communicating device; local executable instructions that when executed on the portable communicating device allow communicating overtly and covertly data sections; and one or more dedicated hardware device(s) capable of displaying and/or playing the covertly sections.

According to some embodiments, the local executable instructions for communication of overtly and covertly data sections may include sending and/or receiving a message, said message may include overtly and covertly data sections, wherein the covertly data is selectively manipulated by a sender of the message.

According to some embodiments, the communication may be dynamic.

According to some embodiments, the dynamic communication include creation of a sub groups.

According to some embodiments, the subgroup may include one or more secret subgroup(s), or any combination thereof.

According to some embodiments, selectively manipulating the covertly data by the system, includes adding one or more restrictions to the message decryption to create overt and covert data sections in the message, such that viewing and/or hearing the message by one or more end users is selective.

According to some embodiments, the dedicated external hardware of the system is in the form of external display and/or earplugs.

According to some embodiments, the system may further include an additional authentication step for identifying specific users.

According to some embodiments, the additional authentication may include of RF-ID such as Near Field Communication (NFC) tag and/or Quick Response (QR) code means. According to some embodiments, the NFC and/or QR may be assimilated in, embedded with or associated with wearables. In some embodiments, the QR may be in the form of special QR tattoos.

According to some embodiments, the portable communication device of the system may include one or more of: a processor, a transmitting unit, a receiving unit, a display unit, an input unit, a graphical user interface (GUI), location service mechanism, or any combination thereof.

Further embodiments, features, advantages and the full scope of applicability of the present invention will become apparent from the detailed description and drawings given hereinafter. However, it should be understood that the detailed description, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

Some embodiments of the invention are described herein with reference to the accompanying Figs. The description, together with the Figs. makes apparent to a person having ordinary skill in the art how some embodiments may be practiced. The Figs. are for the purpose of illustrative description and no attempt is made to show structural details of an embodiment in more detail than is necessary for a fundamental understanding of the invention. For the sake of clarity, some objects depicted in the Figs. are not to scale.

DETAILED DESCRIPTION OF THE INVENTION

Figure 1:
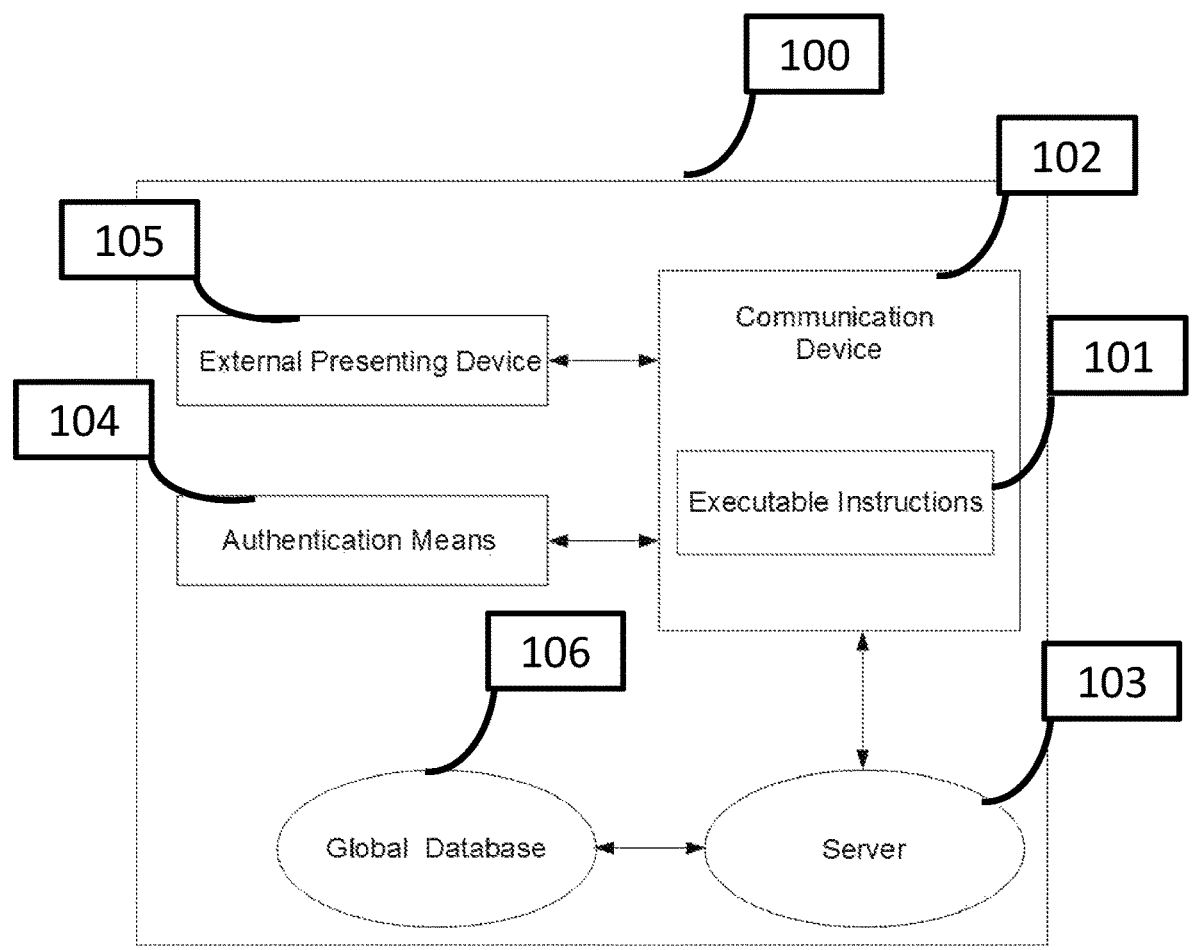
FIG. 1. Illustration of a block diagram of a system for communicating overtly and covertly data sections, according to some embodiments.

The present invention, in embodiments thereof, provides systems, devices and methods that allows dynamic (per message) subgroup creation and communicating overtly and covertly of various types of data while allowing selective viewing/hearing of the covertly data sections.

To facilitate understating, the following terms are defined:

As used herein, the term "manipulative data" refers to data that includes both overtly and covertly sections, which may be manipulated by a user.

As used herein, the term "group" refers to collection of users (participants/members) organised in a predefined set. In some embodiments, all members of a group can potentially receive a communicated message/data.

As used herein, the term "subgroup" refers to subset of users derived from a group, wherein only members of the subgroup (also referred to herein as "recipients") receive a communicated message/data. In some embodiments, a sender of a message/data, which is a member of the subgroup determines the other members of the subgroup.

As used herein, the term "secret subgroups" refers to subset of members derived from a subgroup, wherein only members of the secret subgroup are able to view/hear the covert sections of a message/data, sent within the subgroup.

As used herein, the term "overtly sections" refers to sections/portions/parts of a communicated message/data that can be viewed/heard without any restrictions. In some embodiments, overtly sections are visible/hearable to every member of the subgroup.

As used herein, the term "covertly sections" refers to sections/portions/parts of a communicated message/data that have at least one restriction that limit their presentation (viewing/hearing).

As used herein, the term "Private/Public key pair" refers to pair of encryption keys where one key is used for encryption and the other key is used for decryption.

As used herein, the term "Symmetric Key" refers to encryption key that is used for both encryption and decryption.

As used herein, the term "$3^{rd}$ party chat application" refers to any existing chat application which in not the "local executable instructions" of the present invention.

In some embodiments, the terms "local executable instructions" and "local application" can interchangeably be used.

As used herein, the term "second authentication means" is directed to any type of physical or virtual authentication means that may be used to authenticate/verify a user. In some embodiments, the second authentication means is used in addition to the ID of the portable communicating device.

According to some embodiments, there is provided a system for communicating overtly and covertly sections, the system includes one or more of: a portable communicating device; local executable instructions that when executed on the portable communicating device can allow communicating overtly and covertly data sections; one or more second authentication means; one or more Global database (DB) and/or servers; one or more additional dedicated hardware device(s) capable of displaying/playing the covertly sections. Each possibility is a separate embodiment.

Reference is made to FIG. 1, which illustrates a block diagram of a system for communicating overtly and covertly data sections, according to some embodiments. As shown in FIG. 1, system (100) can include the following elements: a portable communicating device (shown as communicating device 102), having installed thereon local executable instructions (such as in the form of a local application) that when executed, allow communicating overtly and covertly data sections between users. In some embodiments, the local executable instructions (shown as executable instructions, 101) can be in the form of a local application installed and executed on the device. In some embodiments, the device (102) can be a smartphone. According to further embodiments the local executable instructions (such as in the form of a local application) can be readily implemented within or added on existing communication applications (such as, chat applications). According to some embodiments the system may further include second authentication means (shown as authentication means 104). The second authentication means may include, for example, an external physical means, such as, dedicated bar code, QR code and/or RF-ID such as NFC element, as further detailed herein below. In some embodiments, the system may further include one or more global database (106) and/or servers (103) that supports multiplicity of end users. In some embodiments, the system may further optionally include an additional dedicated hardware device (shown as external presenting device 105), that can allow viewing/hearing of the covertly sections, instead of or in addition to the presentation on the communicating device.

According to some embodiments, there is provided a system for communicating overtly and covertly data sections, the system includes: a portable communicating device; local executable instructions that when executed on the portable communicating device can allow communicating overtly and covertly data sections; and one or more of: second authentication mean(s), one or more Global database (106) and/or servers (103), one or more additional dedicated hardware device(s) capable of displaying/playing the covertly sections, or any combination thereof. Each possibility is a separate embodiment.

According to some embodiments, there is provided a system for communicating overtly and covertly data sections, the system includes: a portable communicating device; local executable instructions that when executed on the portable communicating device can allow communicating overtly and covertly data sections; and one or more second authentication mean(s).

According to some embodiments, there is provided a system for communicating overtly and covertly data sections, the system includes: a portable communicating device; local executable instructions that when executed on the portable communicating device can allow communicating overtly and covertly data sections; and one or more Global database (DB) and/or servers.

According to some embodiments, there is provided a system for communicating overtly and covertly data sections, the system includes: a portable communicating device; local executable instructions that when executed on the portable communicating device can allow communicating overtly and covertly data sections; and one or more additional dedicated hardware device(s) capable of displaying/playing the covertly sections.

According to some embodiments, there is provided a system for communicating overtly and covertly data sections, the system includes: a portable communicating device; local executable instructions that when executed on the portable communicating device can allow communicating overtly and covertly data sections; and one or more additional dedicated hardware device(s) capable of displaying/playing the covertly sections.

According to some embodiments, there is provided a system for communicating overtly and covertly data sections, the system includes: a portable communicating device; local executable instructions that when executed on the portable communicating device allow communicating overtly and covertly data sections, wherein the local executable instructions may include one or more of the steps of: creating a sub group of member(s); creating a message comprising overtly data section(s) and covertly data section(s); selectively manipulating the covertly data section(s) by a sender; and sending the message to the subgroup; the system may further include one or more additional dedicated hardware device(s) capable of displaying/playing the covertly sections. In some embodiments, the subgroup further comprises one or more secret subgroup(s), or any combination thereof.

According to some embodiments, there is provided a method for dynamic communication of overtly and covertly data sections, the method comprising sending/receiving a message, said message may include overtly and covertly data sections, wherein the data may be selectively manipulated by the sender of the message, wherein the dynamic communication may include creation of a sub group.

According to some embodiments, there is provided a method for dynamic the method may include one or more of the steps of:

creating a sub group of member(s);
creating a message comprising overtly data section(s) and covertly data section(s);
selectively manipulating the covertly data section(s) by a sender; and
sending the message to the subgroup.

In some embodiments, the subgroup may include one or more secret subgroup(s) or any combination thereof.

In some embodiments, the data includes one or more of: text messages, images, documents, audio files and/or video files, or any combination thereof.

In some embodiments, the method may include one or more of the steps of:
i. registration;
ii. creating group and symmetric key;
iii. distributing the symmetric key (optionally via $3^{rd}$ party chat application such as WhatsApp, Viber, Messenger, and the like);
iv. creating a manipulated message by adding one or more restrictions to the message decryption to create overt and covert data sections in the message;
v. adding a file to the message;
vi. setting a "subgroup";
vii. setting "secret subgroup/s";
viii. sending the message to the "subgroup";
ix. receive the message;
x. viewing/hearing the message by one or more end users (recipients), wherein the viewing/hearing of the message is selective;
xi. download an attached file, wherein the file download is selective;

According to some embodiments, the symmetric key distribution may be done via $3^{rd}$ party chat application such as WhatsApp, Viber, Messenger, and the like).

In some embodiments, the message may be sent to the "subgroup" via 3$^{rd}$ party chat application.

In some embodiments, the message may be received via 3$^{rd}$ party chat application.

According to some embodiments, the selective viewing/hearing step may include validating that the recipient is approved to view/hear the covert data sections of the message (member of the "secret sub group").

In some embodiments, the validation may include determining one or more of: optional time restriction is met; optional location restriction is met, optional force group decryption restriction is met; or any combination thereof.

In some embodiments, the selective viewing/hearing step may be subject to the use of dedicated external hardware.

In some embodiments, the dedicated external hardware may be in the form of external display/earplugs.

In some embodiments, the step of download an attached file may include validating that the recipient is approved to download the attached file.

In some embodiments, the validation may include determining one or more of: time restriction is met; number of users that already downloaded the file restriction is met, or any combination thereof.

In some embodiments, the method is used for communicating the message between at least two end users, between groups of users and/or between sub-groups of users.

In some embodiments, the selective manipulation of the covertly data section may be restricted to specific users, specific time, specific geographical location, force group decryption mode or any combinations thereof.

In some embodiments, the dynamic communication can be determined or modified per each message.

In some embodiments, the selective manipulation of the covertly data can be determined or modified per each message.

In some embodiments, the multiple overtly and covertly sections are included within the same message.

In some embodiments, the manipulation may include multiple manipulations within the same message.

In some embodiments, the multiple manipulations may include: a full message for a small secret subgroup (derived from the secret subgroup), partly manipulated message for the secret subgroup, and a fully manipulated message to the rest of the subgroup of users, or any combination thereof.

In some embodiments, the method may include an additional authentication step for identifying specific users.

In some embodiments, the additional authentication may include use of NFC and/or QR means. In some embodiments, the NFC and/or QR means may be assimilated, embedded with or associated with wearables, such as, clothing, watches, fitness trackers, hats, etc. In some embodiments, the QR may be in the form of special QR tattoos.

In some embodiments, the additional authentication may serve as recipient's second authentication.

In some embodiments, the additional authentication may serve as sender's digital signature.

In some embodiments, the recipient may need to use external dedicated hardware to view/hear the covertly sections.

In some embodiments, the external dedicated hardware may be in the form of external display/earplugs.

In some embodiments, the method is executed on a portable communication device comprising one or more of: a processor, a transmitting unit, a receiving unit, a display unit, an input unit, a graphical user interface (GUI), location service mechanism. or combinations thereof. In some embodiments, the portable communication device is a smartphone. In some embodiments the smartphone includes an operating system such as iOS and Android.

According to some embodiments, there is provided a method for communication of overtly and covertly data sections, the method may include sending/receiving a message, said message may include overtly and covertly data sections, wherein the data may be selectively manipulated by the sender of the message.

According to some embodiments, the communication is dynamic, wherein the dynamic communication includes creation of one or more subgroups per message.

In some embodiments, the methods for dynamic communication of overtly and covertly data sections of the present invention may include one or more of the following steps:

i. Registration;
ii. Creating group and symmetric key;
iii. Distributing the symmetric key;
iv. Creating a manipulated message by adding one or more restrictions to the message decryption to create overt and covert data sections in the message;
v. Adding a file to the message;
vi. Setting a "subgroup";
vii. Setting "secret subgroup/s";
viii. Sending the message to the "subgroup";
ix. Receiving the message;
x. Viewing/hearing the message by one or more end users (recipients), wherein the viewing/hearing of the message is selective;
xi. downloading an attached file, wherein the file download is selective.

Figure 2:
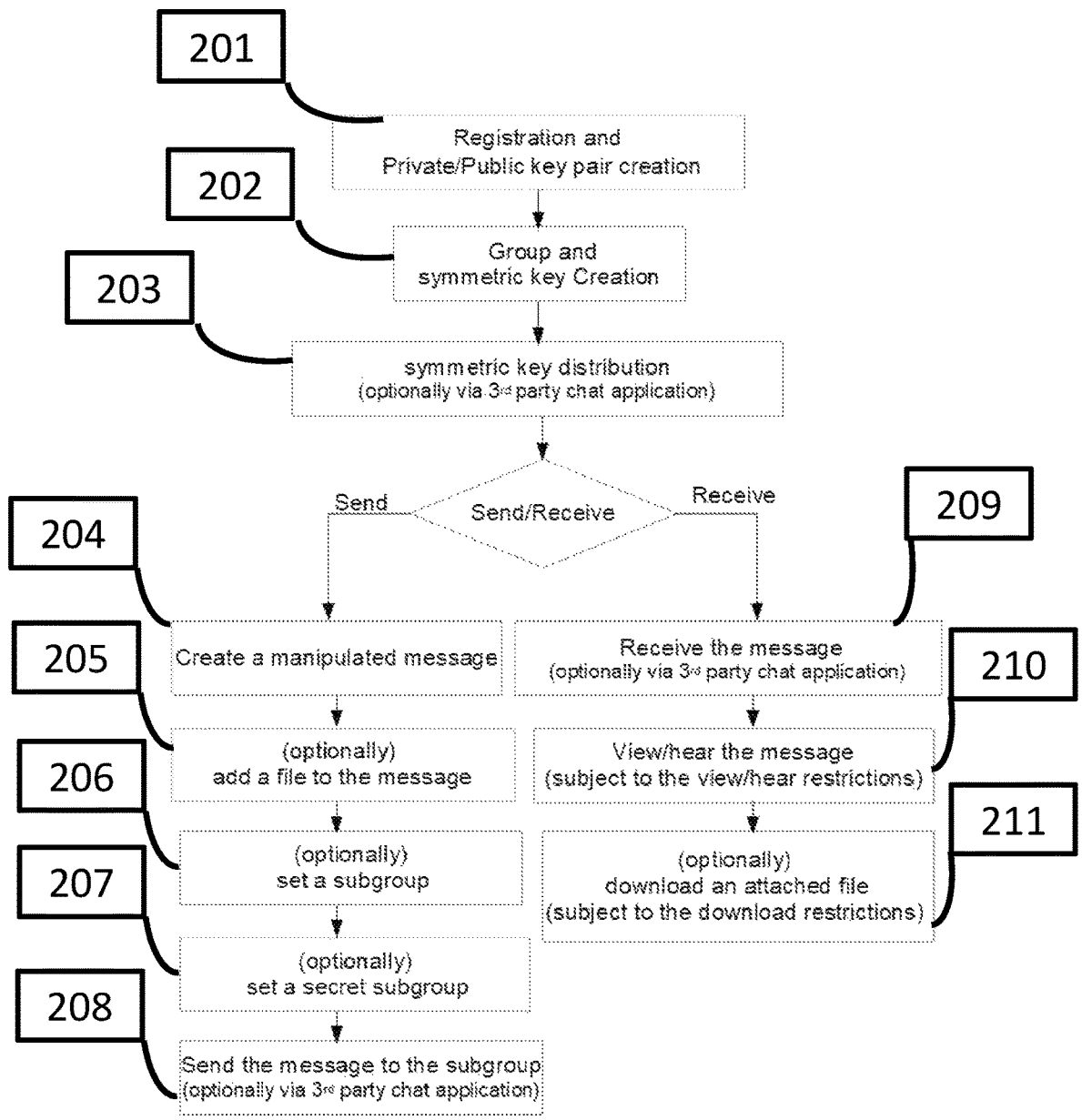
FIG. 2. A block diagram of steps of a method for communicating overtly and covertly data sections, according to some embodiments.

Reference is now made to FIG. 2, which illustrates steps in methods of the present disclosure, according to some embodiments. At step 201, registration of a user may be performed. Next, at step 202, groups are created (group creation), in addition to creation of symmetric keys. At step 203, the symmetric key (created at step 202) is distributed. In some embodiments, the distribution may optionally be performed via 3$^{rd}$ party chat application such as WhatsApp, Viber, Messenger, and the like. At step 204, a manipulated message is created/composed, by adding one or more restrictions to the message decryption to create overt and covert data sections in the message. At optional step 205, a file may be added to the message. At step 206, a subgroup may be created/set. At optional step 207, one or more secret subgroups can be set. At step 208, the message is sent to the subgroup. In some embodiments, sending the message to the subgroup may optionally be performed via 3$^{rd}$ party chat applications. At step 209 the message is received by the subgroup member(s). The receiving step is executed at the device of the subgroup member(s) (i.e. recipients). Receiving the message may optionally be performed via 3$^{rd}$ party chat applications. At the next step (210), the message can be viewed/heard by the recipients, wherein the viewing/hearing of the message can be selective. At optional step 211 the recipients can download an attached file, wherein downloading of the file can be selective.

The embodiments presented below provide an exemplary description of the various steps/functions supported/executed by the methods of the present disclosure, and their implementation in the suitable devices and systems.

Registration

In some embodiments, registration step 201 may be performed after the local application is installed on the portable communicating device (for example, a smartphone). In some embodiments, the registration step may include providing user details such as, for example, user name, address, phone number, etc. The registered phone number may be validated by means known in the art, for example, by sending an SMS to the phone. After a successful validation, the local application can generate a private/public key pair, which is used to distribute symmetric keys that can be used in the encryption and decryption of the messages. The public part of the key is added to the user's record on a global database (DB). The user's record on the DB can contain one or more of the following fields:

Phone number.
Name.
Address
Public key.
Record creation date.
Record validity.
Assigned NFCs and/or QR.
Assigned external display and/or external earplugs.

In some embodiments, once the registration process is complete, the user can create new groups and distribute symmetric keys which are used in the encryption and decryption of the messages.

In some embodiments, the user's record on the DB can be updated at will.

Group (and Symmetric Key) Creation.

Figure 3:
FIG. 3. Illustration of a graphical user interface (GUI) display view (screenshot) showing group creation, according to some embodiments.

Reference is made to FIG. 3 which illustrates a screenshot of a graphical user interface showing group creation step in the method for communicating overtly and covertly data sections, according to some embodiments. The group creation step may include one or more separate steps. During the first step of a new group creation, the local executable instructions (local application) randomly creates a new symmetric key. Thereafter, the group creator (a user) is asked to assign members to the group (shown as "check" signs 301, 302). The created group may include one or more of the following fields:

Group name;
Group picture or icon;
Group members;
Key value;
Creation date.

In some embodiments, during the second step of the of a new group creation the local application sends "join invitation" request to each one of the group members. For each group member that accepts the invitation, the local application securely sends the symmetric key using the member's own public key.

Figure 4:
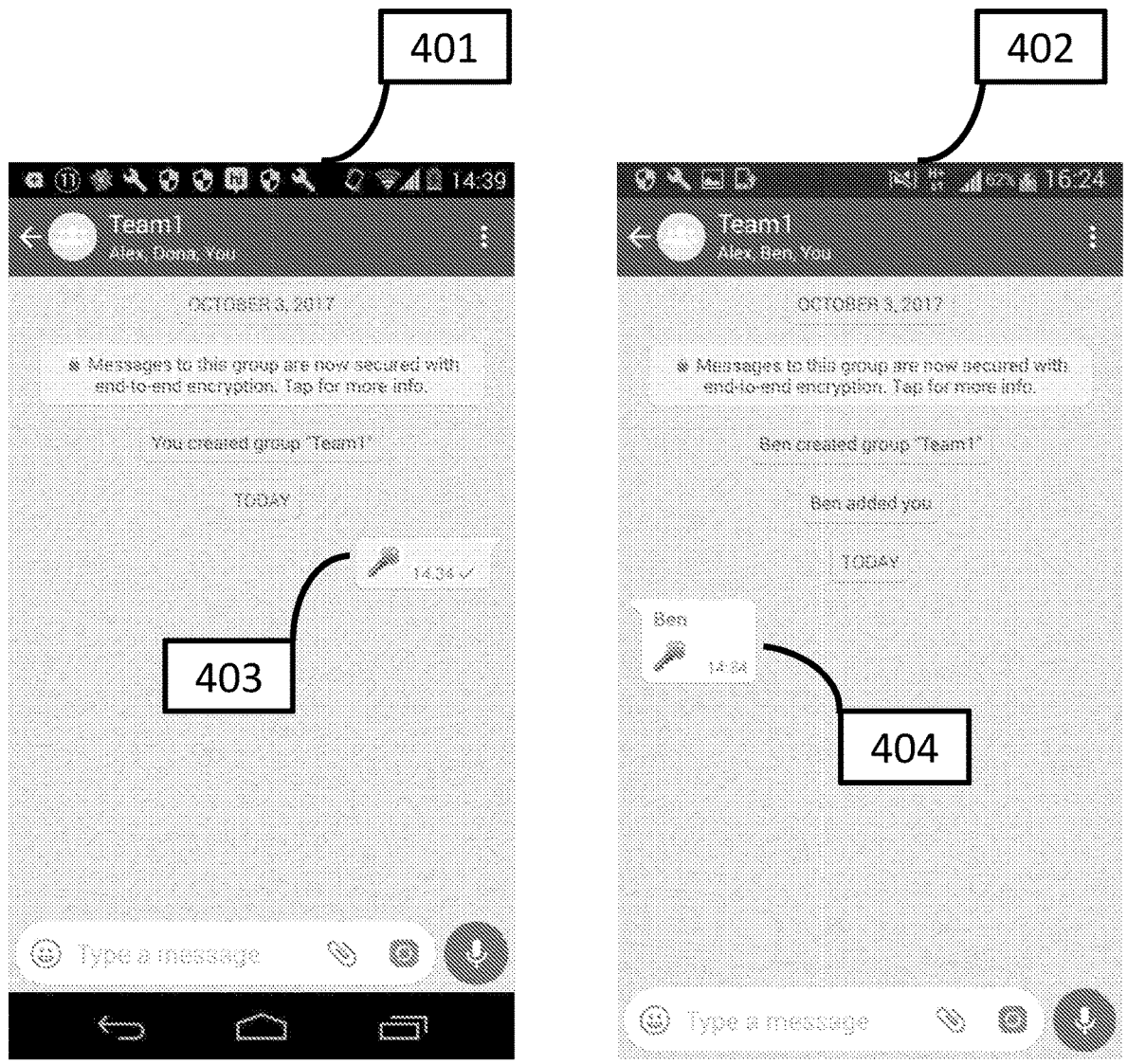
FIG. 4. Illustration of a display view of key distribution via 3rd party chat application, according to some embodiments.

In some instances, the symmetric key can be sent via $3^{rd}$ party chat applications. Reference is now made to FIG. 4, which illustrates a screenshot of a group creator (screen 401) and screenshot of a subgroup member (screen 402), during distribution of symmetric key via $3^{rd}$ party chat application. Keys icons 403 and 404 represent the visible overt data sections of the symmetric key distribution. The key details (which are covert) may be encoded by various means, for example, by using invisible characters, such that they are not visible to the naked eye.

Compose (Write) the Message

Figure 5:
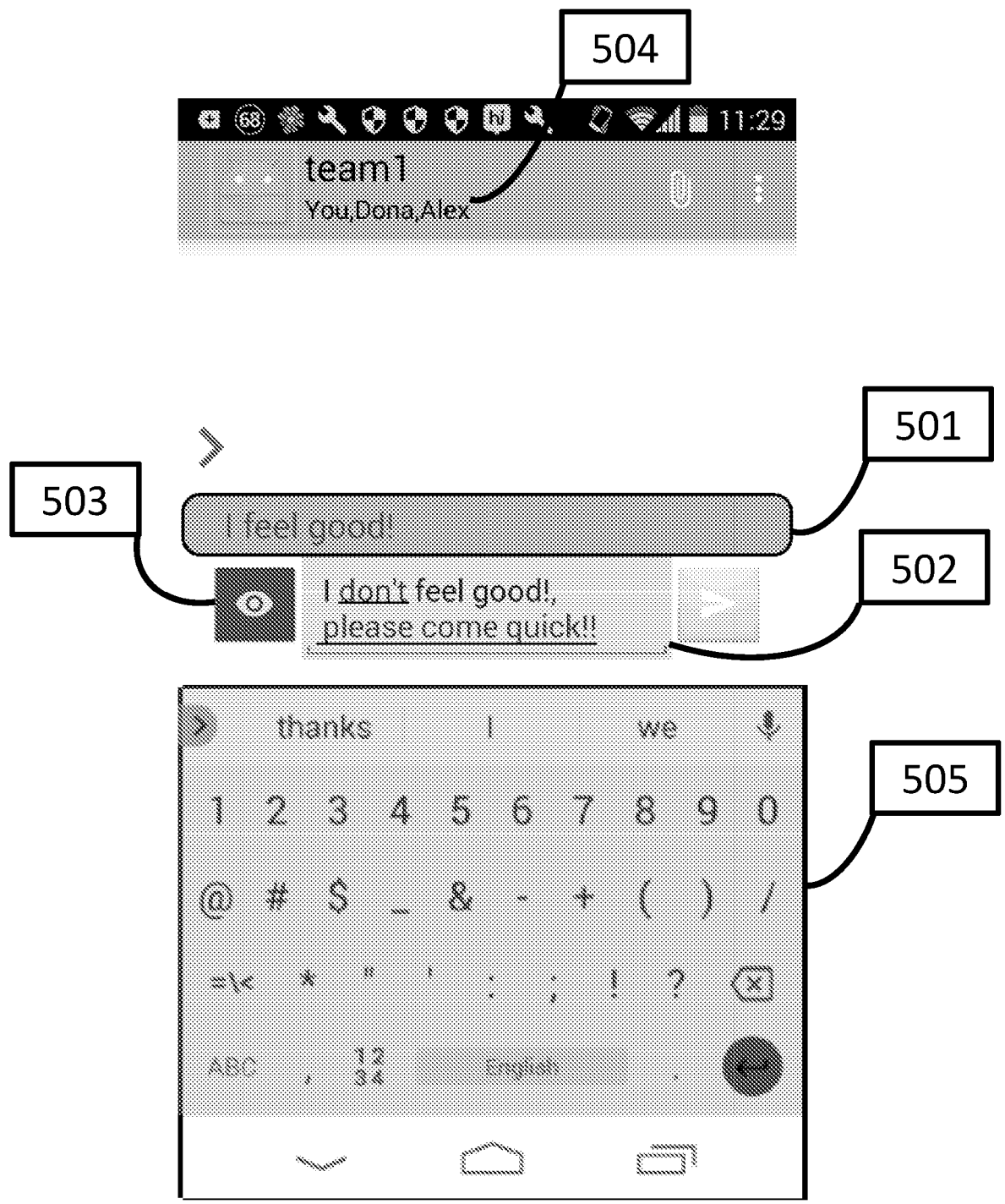
FIG. 5. Illustration of a graphical user interface display view showing a message creation.

Reference is made to FIG. 5, which illustrates a screenshot of a graphical user interface showing a message creation, according to some embodiments. While composing the message (for example, using virtual keyboard, 505), the sender can easily switch between overtly and covertly sections, for example, by toggling a dedicated icon (shown as eye icon 503 in FIG. 5). The entire message (message 502) contains a mixture of overtly and covertly sections, where the overtly sections (501) can be viewed/heard by all users that participate in the communication ("subgroup"), and the covertly sections within message 502 (marked with underline) can be viewed/heard only by selected subgroup/s ("secret subgroup/s"). The selected secret subgroup members may be listed in a dedicated area (for example, area 504 in FIG. 5). In some embodiments, to the naked eye, the message that is viewed/heard by members of the subgroup that are not part of the "secret subgroup/s" contain only the overtly sections (501).

In some embodiments, a group may include any number of members (for example, up to 250 members), a subgroup may include all or part of the members of the group and the secret subgroup may include all or part of the members of the subgroup. For example, a group can include 20 members, a subgroup can include 10 members and the secret subgroup can include 5 members. The inclusion/exclusion of members between subgroups and/or secret subgroups can be dynamically set per message.

Add Restrictions to the Message Reception and Decryption.

In some embodiments, the message composer (sender) can restrict one or more group members from receiving the message (i.e., creating a subgroup).

Figure 6A:
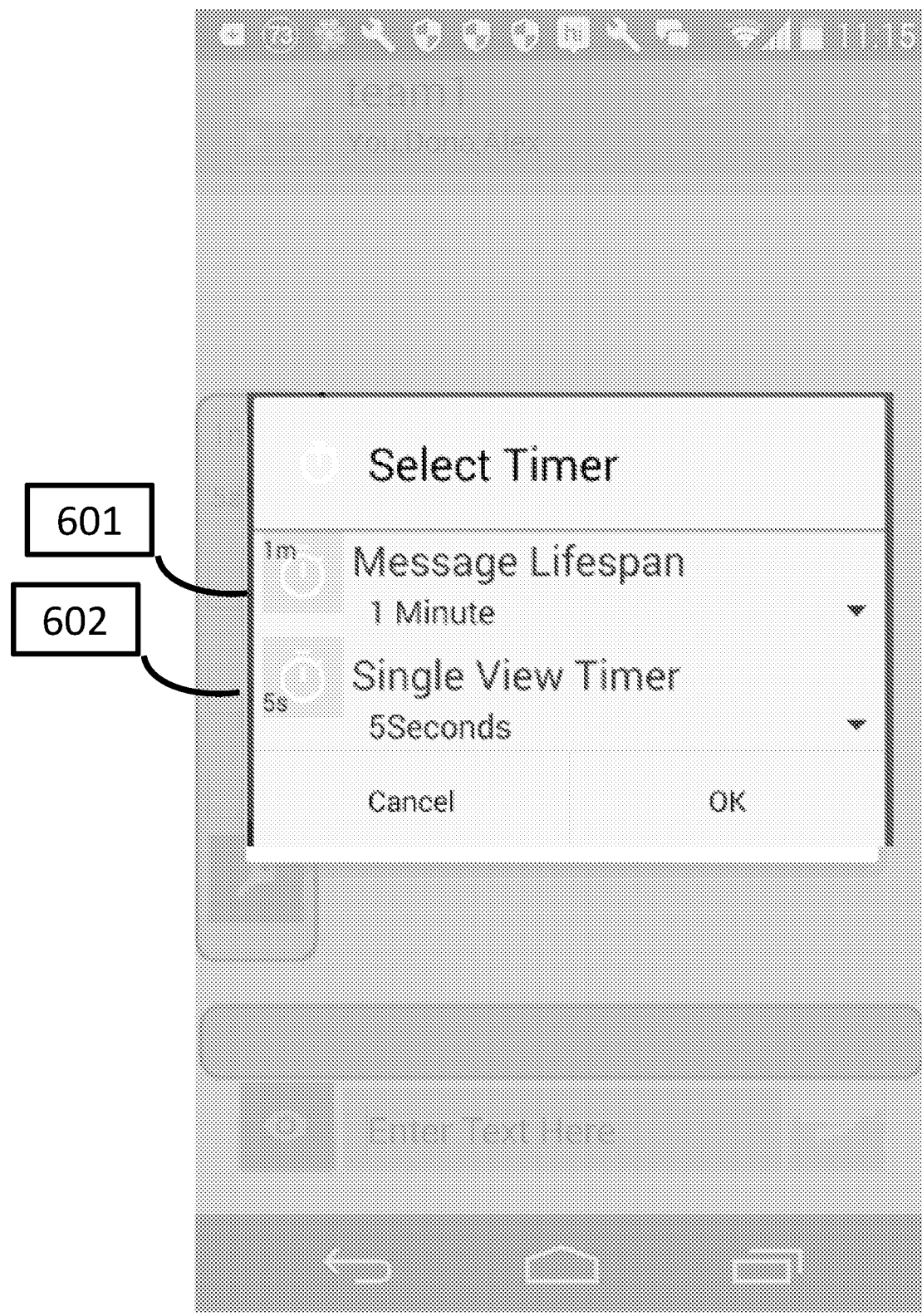
FIG. 6A. Illustration of a graphical user interface display view showing adding view restriction based on time and duration, according to some embodiments.

In some embodiments, the sender can add one or more of the following restrictions to the message decryption:

Limit the option to view/hear the covertly sections of the message to a specific time frame (As illustrated, for example, in FIG. 6A, 601).

Limit the time duration of which the covertly sections of the message can be viewed/heard (As illustrated, for example, in FIG. 6A, 602).

Figure 6B:
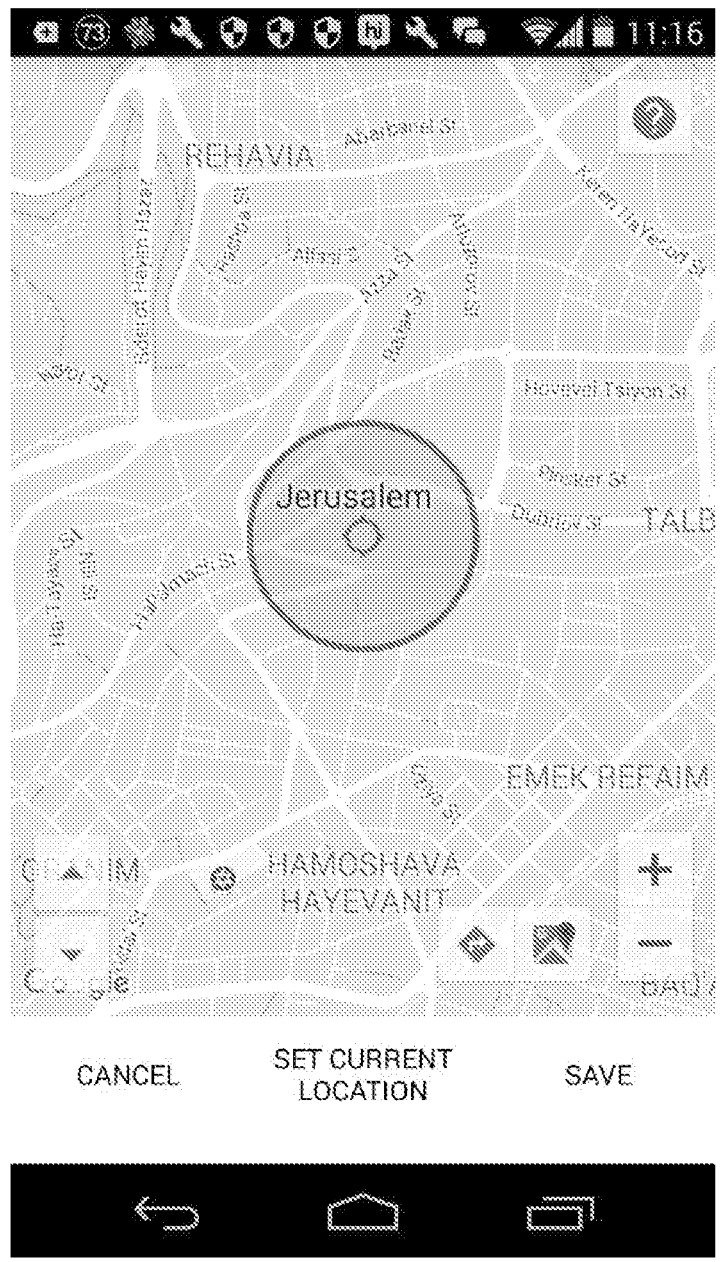
FIG. 6B. Illustration of a graphical user interface display view showing adding view restriction based on geographical location, according to some embodiments.

Limit the option to view/hear the covertly sections of the message to a specific geographical location (As illustrated, for example, in FIG. 6B).

Figure 6C:
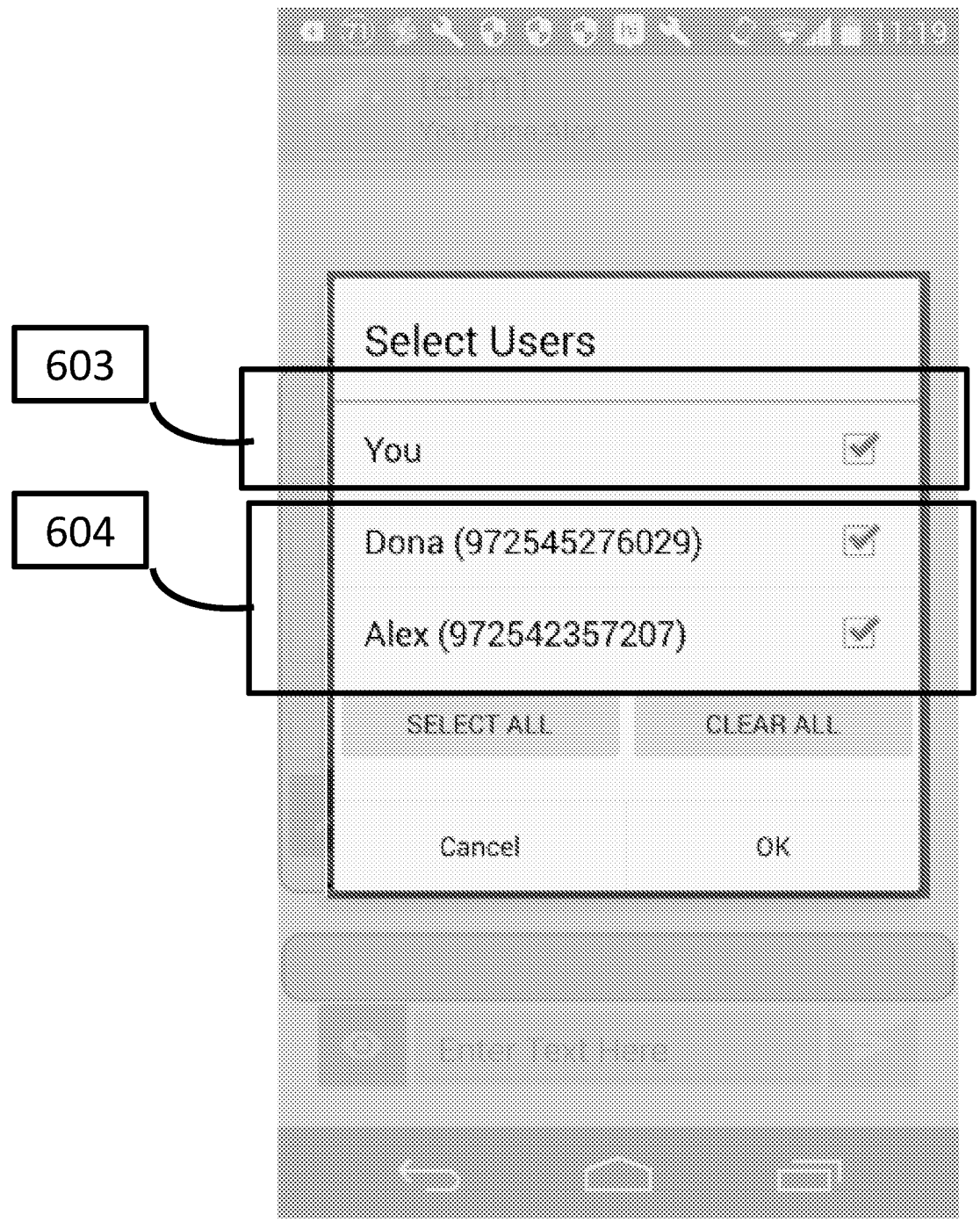
FIG. 6C. Illustration of a graphical user interface display view showing adding view restriction based on user ID, according to some embodiments.

Ban recipients from viewing/hearing the covertly sections of a specific message (create a "secret sub group") (As illustrated, for example, in FIG. 6C, 604).

Ban the sender from viewing/hearing the covertly sections of a specific message (As illustrated, for example, in FIG. 6C, 603).

Force group decryption (for example, viewing/hearing the covertly sections of the message is possible only if the recipients view/hear the message at the same time frame and/or at the same location).

Add a File to the Message

In some embodiments, if the sender wants to add a file to the message, the local application can upload the file to a Global DB and add a link to the message. As for the file, the sender can limit (apart from the message restrictions) the time window and/or location in which the file can be downloaded, and/or restrict the number of users that can download the file (on a "first come first serve" basis, or any other basis).

In some embodiments, when expired, the file may be deleted from the DB. For example, the file may be deleted, once a predetermined number of downloads has been reached.

Figure 7:
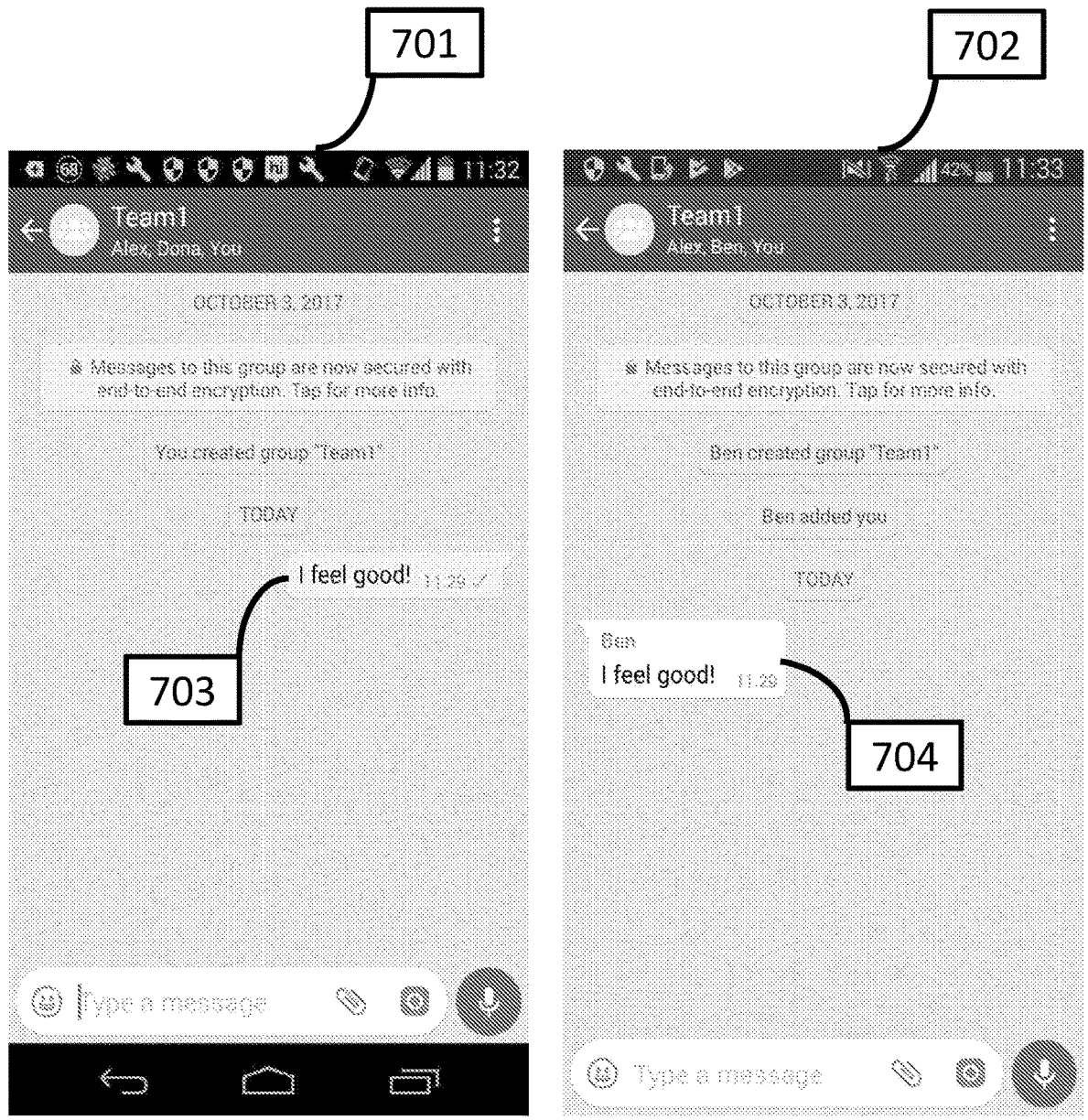
FIG. 7. Illustration of a display view (screenshot) showing message distribution via $3^{rd}$ party chat application, according to some embodiments.

In some instances, the message can be sent via $3^{rd}$ party chat applications. Reference is now made to FIG. 7, which illustrates a screenshot of a sender (screen 701) and screenshot of a subgroup member (screen 702), during sending a message via $3^{rd}$ party chat application. Fields 703 (on the sender screen) and 704 (on the subgroup member screen) represent the visible overt data sections of the message. The covertly data sections of the message may be encoded by various means, for example, using invisible characters, such that they are not visible to the naked eye.

View/Hear a Message

In some embodiments, for the hearing/viewing of an entire message (i.e., message that includes both overtly and covertly sections), one or more conditions should be met, wherein the conditions are defined by the sender of the message.

In some embodiments, the conditions may be selected from, but not limited to:
The recipient is a member of the "secret sub group";
The time restrictions (if existed) are met;
The geographical location restrictions (if existed) are met;
The second authentication (if required) is presented;
The force group decryption restrictions (if existed) are met; and/or
The recipient has a dedicated external display/earplug (if required).
Each possibility is a separate embodiment.

Download an Attached File

In some embodiments, in order to download an attached file, one or more conditions should be met, wherein the conditions are defined by the sender of the message.
In some embodiments, following is an exemplary list of such conditions:
The time restrictions are met; and
The number of users that already downloaded the file did not exceed the limit;

NFC and/or QR

In some embodiments, an RF-ID such as NFC and/or barcode, QR code may further be used as a second authentication method.

The NFC or QR tags can be attached to, embedded with, formed with and/or assimilated in wearables, such as, fabric, clothing, smart watch, watches, fitness trackers, hats, etc.

In some embodiments, special dedicated tattoos (such as temporary tattoos), stickers, detachable patches, may be used as QR codes.

Assigning NFC and/or QR to the Local Application.

In some embodiments, the user can assign the NFC and/or QR to the portable device by opening a dedicated tab in the local application and scan the NFC and/or QR, the scan information is sent by the local application to the global DB and at least some of the following terms may be verified:
The NFC and/or QR is legitimate.
The NFC and/or QR is not being used by another portable device.
The NFC and/or QR validity is not expired.
If the selected terms were verified the NFC and/or QR is assigned to the portable device.

Second Authentication Supported Actions.

Figure 8:
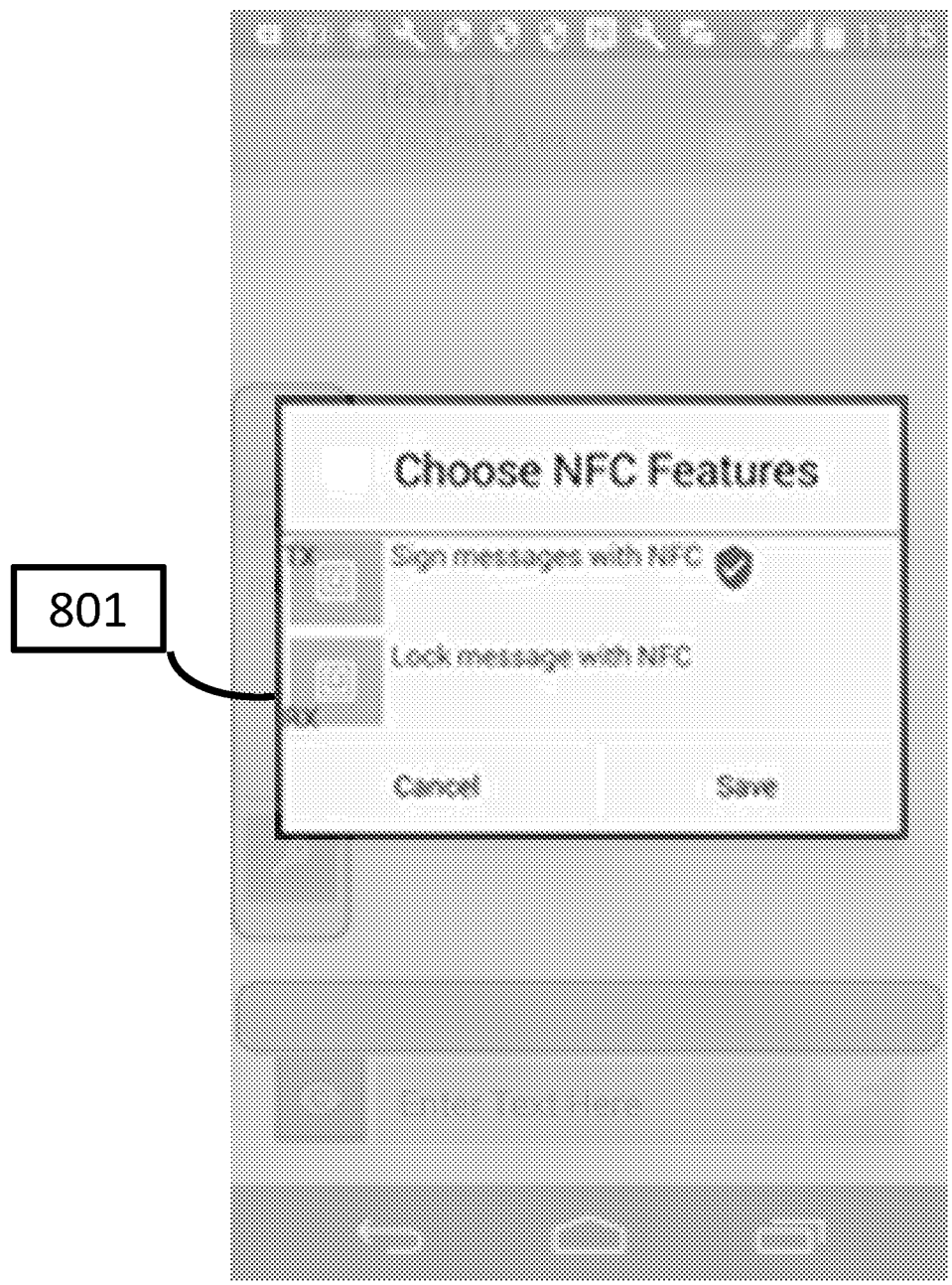
FIG. 8. Illustration of a graphical user interface display view showing how a sender can force a recipient to use second authentication, according to some embodiments.
Figure 9:
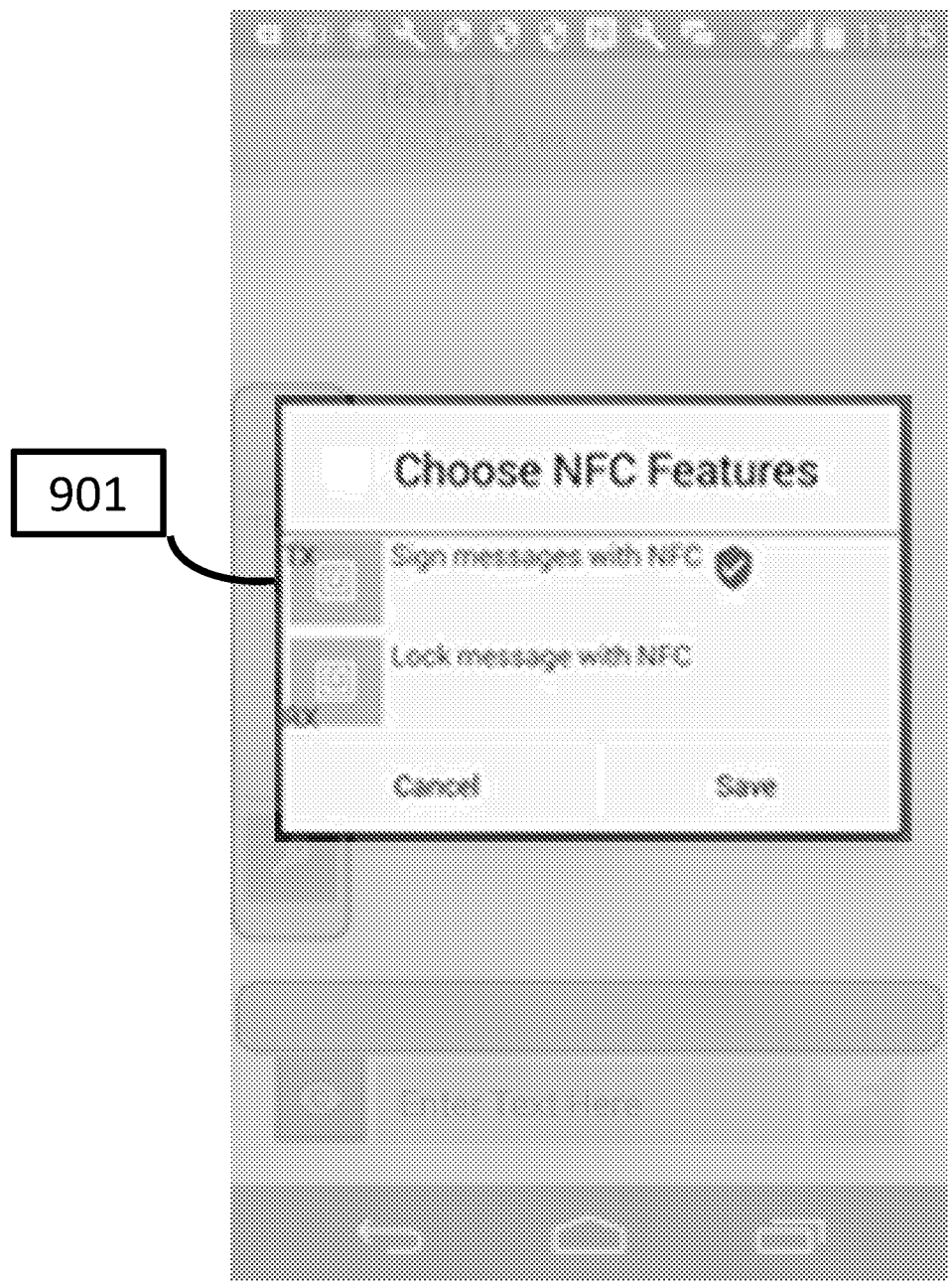
FIG. 9. Illustration of a screenshot of a graphical user interface showing using second authentication as a digital signature, according to some embodiments.

In some embodiments, the NFC and/or QR can be used as a second authentication for one or more of the following actions:
Every time the user activates the local application.
Every time the user opens a message for example: from specific groups, on specific times, at specific geographical locations, or any combination thereof.
The sender can force the recipients to use a second authentication on a specific message (As illustrated, for example, in FIG. 8, 801).
In some embodiments, the NFC and/or QR can be used by the sender as a "digital signature" to the sent message (As illustrated, for example, in FIG. 9, 901).

External Hardware Device.

In some embodiments, an external hardware device can be used to display or play the covertly data sections. In some embodiments, the external hardware can be a display device, such as, for example, smart watch, LCD display. In some embodiments, the external hardware can be an audio player device, such as, for example, earplugs, dedicated speaker, etc.

Pair an External Hardware Device to the Local Application.

In some embodiments, the user can pair the external hardware device to the portable device via a dedicated pairing tab. During the paring process the external hardware device information is sent by the local application to the global DB and the following terms may be verified:
The external hardware device is legitimate.
The external hardware device is not being used by another portable device.
The external hardware device validity is not expired.
If all the terms were verified the external hardware device is paired to the portable device According to some embodiments, the methods of the current disclosure are implemented as local executable instructions.

According to some embodiments, one or more of the steps of the method of the present invention may be performed via $3^{rd}$ party chat applications. According to some embodiments, at least one of the steps of the method of the present invention may be performed via $3^{rd}$ party chat applications. According to some embodiments, one or more of the steps of the method of the present invention may be performed using $3^{rd}$ party chat applications.

Figure 10:
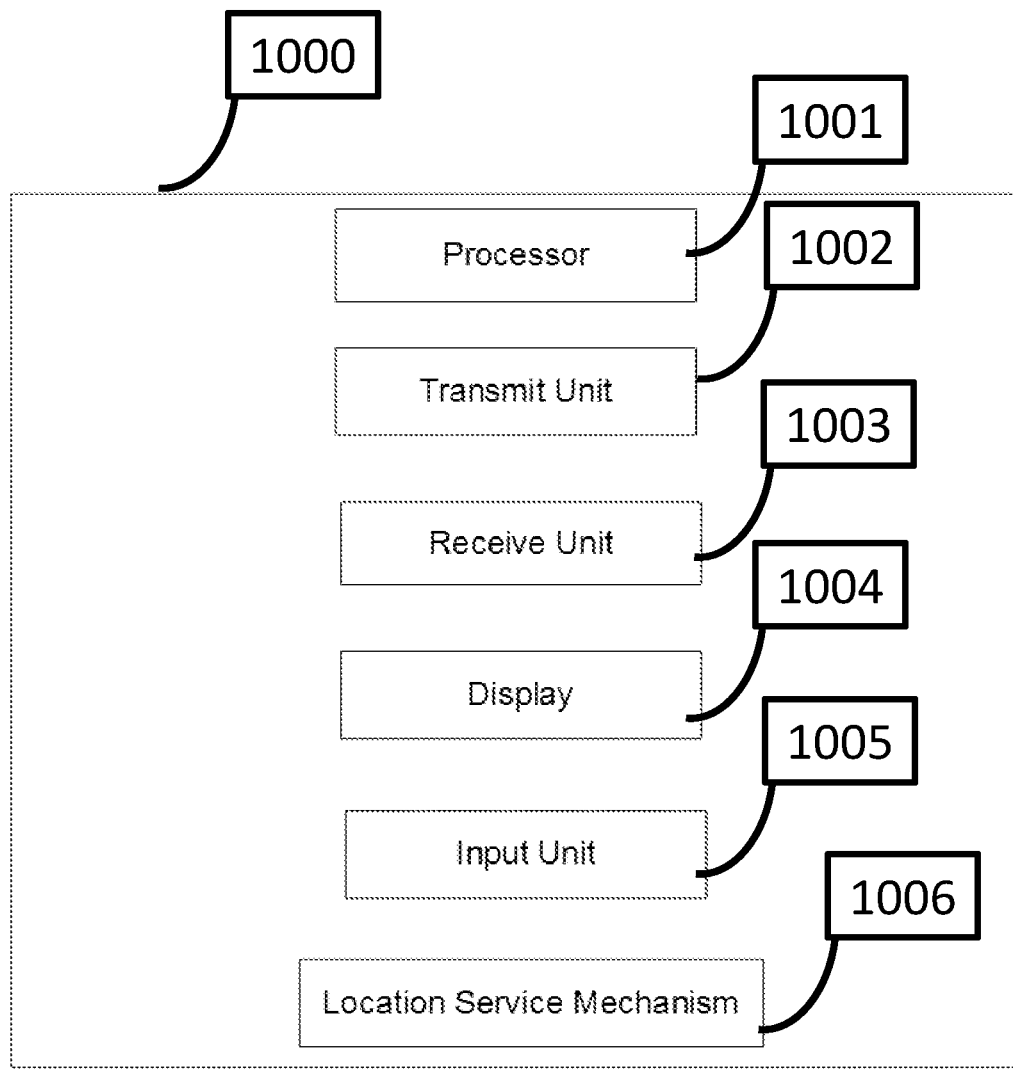
FIG. 10. Illustration of a block diagram of a device for communicating overtly and covertly data sections, according to some embodiments.

Reference is made to FIG. 10, which illustrates a block diagram of a device for communicating overtly and covertly data sections, according to some embodiments. As shown in FIG. 10, communication device (1000) can include one or more of: a processor (1001), a transmitting unit (1002), a receiving unit (1003), a display unit (1004) an input unit (1005), a graphical user interface (GUI), location service mechanism (1006), or combinations thereof, said device is capable of executing a method for dynamic communication of overtly and covertly data sections, the method comprising sending/receiving a message, said message comprises overtly and covertly data sections, wherein the covertly data may be selectively manipulated by the sender of the message, wherein the dynamic communication comprises creation of one or more sub groups.

According to some embodiments, there is provided a communication device capable of executing a method of dynamic communication of overtly and covertly data sections. In some embodiments, the method executed on the device is implemented in the form of local executable instructions. In some embodiments, the communication device is a portable device. In some exemplary embodiments, the portable communication device is a smartphone.

According to some embodiments, the portable communication device may include one or more of: a processor, a transmitting unit, a receiving unit, a display unit, an input unit, a graphical user interface (GUI), location service mechanism, or combinations thereof.

In some embodiments, the communication device is capable of executing a method for dynamic communication of overtly and covertly data sections, the method comprising sending/receiving a message, said message comprises overtly and covertly data sections, wherein the data may be selectively manipulated by the sender of the message, wherein the dynamic communication comprises creation of one or more sub groups.

In some embodiments, the communication device is capable of executing a method for dynamic communication of overtly and covertly data sections, the wherein method includes one or more of the steps of: creating a sub group of member(s); creating a message comprising overtly data section(s) and covertly data section(s); selectively manipulating the covertly data section(s) by a sender; and sending the message to the subgroup. In some embodiments, the subgroup may include one or more subgroups.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1—Implementing the Disclosure for Overtly and Covertly Exchange of Message/Files When using existing chat applications there is a need from time to time to disguise part of the text from prying eyes of potential unauthorized readers/listeners, without attracting attention. Therefore, the present systems, devices and methods can be utilized in one or more of the following exemplary settings:

- When a group is organizing a birthday party for one of its members, they can send a manipulated message where the overtly part say one thing while the covertly part (which can't be viewed/heard by the "birthday boy") say other things.
- When parents wish to send messages within the family chat group, "over" their children's heads.
- When one partner wishes to hide parts of the messages from the other partner while keeping their "innocent" look.
- When the Boss sends messages that should be viewed/heard only during work hours, or only at the company's facilities.
- A couple who wished to add "extra" secret parts to their visible messages that may "vanish" after being viewed/heard.
- Send classified information in a covertly way.
- Writing remarks about the teacher in the class & teacher's chat group.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What we claim is:

1. A method for dynamic communication, the method comprising:
   creating a subgroup of members;
   creating a message comprising both one or more overtly data sections and one or more covertly data sections;
   selectively manipulating the one or more covertly data sections by a sender, said manipulating facilitates manipulation of one or more characters, letters, words, sentences of the message separately, wherein manipulating the covertly data sections comprise adding one or more restrictions to a message decryption, such that viewing and/or hearing the one or more covertly data sections of the message by members of the subgroup is selective, wherein only members of the subgroup are capable of viewing and/or hearing the one or more covertly data sections of the message, thereby creating a manipulated message; and
   sending the manipulated message to the subgroup.

2. The method of claim 1, wherein the subgroup further comprises one or more secret subgroups.

3. The method of claim 1, wherein the data comprises text messages, images, documents, audio files, video files, or any combination thereof.

4. The method of claim 1, further comprising adding a file to the message, wherein downloading of the file by the members of the subgroup is selective.

5. The method of claim 1, wherein sending and/or receiving of the message in the subgroup is done via $3^{rd}$ party chat application.

6. The method of claim 1, wherein the selective viewing and/or hearing comprises validating that a recipient is approved to view/hear the covert data sections of the message, wherein the recipient is a member of the secret subgroup.

7. The method of claim 6, wherein the validating step further comprises determining one or more of: a time restriction is met, a location restriction is met, a force group decryption restriction is met, or any combination thereof.

8. The method of claim 1, wherein the selective viewing and/or hearing is facilitated by dedicated external hardware, wherein the dedicated external hardware is in the form of external display and/or earplugs.

9. The method of claim 4, wherein the step of downloading an attached file comprises validating that the recipient is approved to download the attached file, wherein the validating step further comprises determining that a time restriction is met; and/or that a number of users that already downloaded the file restriction is met.

10. The method of claim 1, for communicating the message between at least two end users, between groups of users and/or between sub-groups of users.

11. The method of claim 1, wherein the dynamic communication is determined or modified per each message and/or wherein the selective manipulation of the covertly data is determined or modified per each message.

12. The method of claim 1, further comprising an additional authentication step for identifying specific users, wherein the additional authentication serves as the recipient's second authentication and/or the sender's digital signature.

13. The method of claim 12, wherein the additional authentication comprises use of Near Field Communication (NFC) and/or Quick Response (QR) means, wherein the NFC and/or QR are assimilated in, embedded with, or associated with wearables, and/or wherein the QR are in the form of QR tattoo(s).

14. The method of claim 1, wherein the method is executed on a portable communication device comprising one or more of: a processor, a transmitting unit, a receiving unit, a display unit, an input unit, a graphical user interface (GUI), location service mechanism, or any combination thereof.

15. A portable communication device comprising one or more of: a processor, a transmitting unit, a receiving unit, a display unit, an input unit, a graphical user interface (GUI), location service mechanism, said communication device is capable of executing a method for dynamic communication of overtly and covertly data sections, the method comprising sending and/or receiving a message, said message comprises both one or more overtly data sections and one or more covertly data sections, wherein the one or more covertly data sections are selectively manipulated by a sender of the message, said selective manipulation facilitates manipulation of one or more characters, letters, words, sentences of the message separately, wherein the dynamic communication comprises creation of a sub group, and wherein manipulating the covertly data sections comprises adding one or more restrictions to a message decryption, such that viewing and/or hearing the message by members of the subgroup is selective, thereby creating a manipulated message.

16. A system for communicating overtly and covertly data sections, the system comprises:
 a portable communicating device comprising one or more of: a processor, a transmitting unit, a receiving unit, a display unit, an input unit, a graphical user interface (GUI), location service mechanism;
 local executable instructions that when executed on the portable communicating device allow communicating both one or more overtly data sections and one or more covertly data sections, said instructions comprises sending and/or receiving a message, said message comprises both one or more overtly data sections and one or more covertly data sections, wherein the covertly data is selectively manipulated by a sender of the message, wherein the selective manipulation facilitates manipulation of one or more characters, letters, words, sentences of the message separately, and wherein the dynamic communication comprises creation of a sub group, the subgroup comprises one or more secret subgroups, wherein selectively manipulating the covertly data comprises adding one or more restrictions to a message decryption to create one or more overt data sections and one or more covert data sections in the message, such that viewing and/or hearing the message by one or more end users is selective; and
 one or more dedicated hardware devices capable of displaying and/or playing the covertly data sections.

17. The system of claim 16, further comprising global servers and/or database.

18. The system of claim 16, wherein the dedicated external hardware is in the form of external display and/or earplugs.

19. The system of claim 16, further comprising an additional authentication means for identifying specific users, said additional authentication means comprises Near Field Communication (NFC) and/or Quick Response (QR).

* * * * *